United States Patent [19]
Little et al.

[11] 3,872,304

[45] Mar. 18, 1975

[54] FLUID FLOW MEASURING SENSOR

[75] Inventors: Little J. Little; Joseph A. Oddo, both of Huntsville, Ala.

[73] Assignee: The United States of America as represented by the Secretary of the Army, Washington, D.C.

[22] Filed: Jan. 25, 1974

[21] Appl. No.: 436,558

[52] U.S. Cl. ......... 250/231 R, 210/222 R, 73/194 E
[51] Int. Cl. ............................................. G01d 5/34
[58] Field of Search...... 250/233, 231 SE, 222, 573, 250/564, 231 R; 356/196–198; 73/228, 194 R, 194 C, 194 E, 255

[56] References Cited
UNITED STATES PATENTS
1,002,635  9/1911  Bratkowski..................... 250/564 X
2,518,149  8/1950  Kearsley............................. 73/194 C
2,813,424  11/1957  Liepman et al................. 250/573 X FOREIGN PATENTS OR APPLICATIONS
1,209,547  10/1970  Great Britain .................... 73/194 E

*Primary Examiner*—Walter Stolwein
*Attorney, Agent, or Firm*—Robert P. Gibson; Natham Edelberg; Herbert H. Murray

[57] ABSTRACT

The device of the present invention involves the use of a circular track with a ball mounted therein. The flow to be measured is introduced tangently into the track and the velocity of the ball circling the track is measured by the interruption of a light beam each time the ball makes a revolution.

1 Claim, 4 Drawing Figures

PATENTED MAR 18 1975　　3,872,304

FLUID FLOW MEASURING SENSOR

BACKGROUND OF THE INVENTION

There has been a need in the industry for a device for measuring fluid flow which is capable of measuring very low level fluid flow, such as in conjunction with a fluid accelerometer, and presenting this measurement as a digital output.

In accordance with the need it is an object of this invention to provide a device for measuring fluid flow rates at a very low level of fluid flow.

Another object of the invention is to provide a fluid flow measurement device having a digital output.

DETAILED DESCRIPTION OF THE INVENTION

Figure 1:
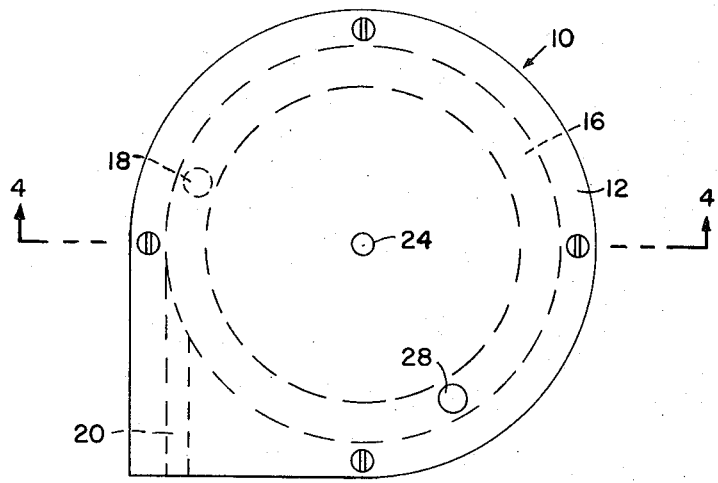
FIG. 1 is a plan view of the device of the present invention.
Figure 2:
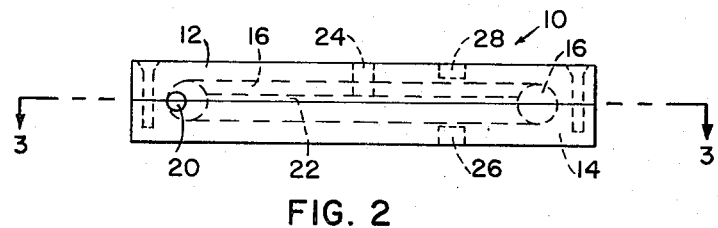
FIG. 2 is an end elevation of the device illustrated in FIG. 1.
Figure 3:
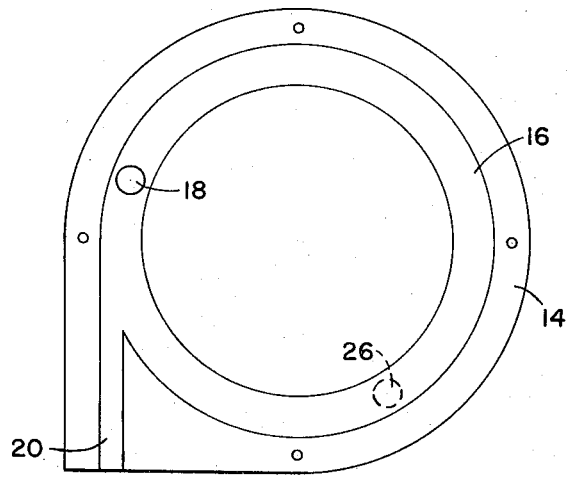
FIG. 3 is a section taken on line 3—3 of FIG. 2.
Figure 4:
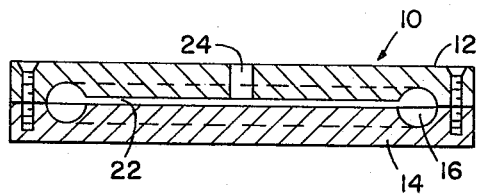
FIG. 4 is a section taken on line 4—4 of FIG. 1.

Referring now to the drawings, 10 indicates a housing having two sections 12 and 14. The housing has formed therein a circular track 16 within which is a ball 18. An inlet passageway 20 introduces the fluid whose flow is to be measured to the circular track 16 tangentially. A circumferential slit 22 is formed in the inner wall of the track 16 and connects with a discharge port 24 to permit escape of the fluid entering from passageway 20.

A light source 26 is mounted in the lower half 14 of the housing 10 in opposition to a photocell 28 mounted in the upper half 12 of the housing 10. The beam from the light source 26 crosses the circular track 16.

In the operation of the device, fluid is introduced through inlet passageway 20 and flows tangent to the outer wall of circular track 16. The fluid impinges on ball 18 to build up a pressure front to overcome the inertia of the ball 18 and induce motion to the ball. The fluid contact with the ball 18 generates a vortex permitting an exhaust through the slit 22 along the inside wall of track 16. Theoretically the ball 18 will absorb the fluid energy and assume the velocity of the fluid. The flow energy of the fluid is transferred to the ball according to the equation $$(M_1/\Delta t)\text{in} = (M_2/\Delta t)\text{out}$$

where $$M_1 = \text{mass flow of fluid}$$
$$M_2 = \text{mass of ball}$$

In the ideal case, the entire energy contained in the fluid will be absorbed in the ball. Therefore, $$M_1/\Delta t = \rho A v$$

where $\rho$ = fluid density

A = cross sectional area $v$ = fluid velocity

By substituting equation 2 into equation 1, $$\omega = M_2/\rho A \Delta t \text{ ft/sec}$$

Assuming that standard atmospheric conditions are maintained, the ball velocity will be a linear function of inlet fluid flow. The mass of the ball 18 must be approximately 10 percent less than the minimum mass of the fluid flow. The walls of the track 16 and the walls and inlet passageway 20 must be very smooth and void of irregularities to maintain laminar flow of fluid along the outside wall of the track.

The means of sampling useful information from the fluid flow measuring device uses a photocell 28. The photocell is shut off when the ball 18 traveling in the track 16 passes between the photocell 28 and its light source 27. This interruption of the light beam to the photocell generates a pulse. The time interval between pulses is a measure of velocity according to the equation:

$$v = r \omega$$

where $r$ = radius in ft $\omega$ = angular velocity in radians/sec.

The use of multiple photocells and light sources at several points around the circular track 16 would serve to increase the resolution of the device.

Since the operation of the device inherently creates pulses it is evident that the output of the device is digital and readily adapted to a meter function or for controlling another mechanism according to the velocity of flow.

We claim:

1. A fluid flow measuring sensor comprising a housing
   a circular track formed in said housing,
   an inlet passageway in said housing entering said track tangentially adjacent the outer wall of said track,
   a slit extending completely around the inner wall of said track and communicating with a discharge passageway in said housing,
   a ball in said circular track,
   means for detecting movement of said ball around said circular track,
   said movement detecting means comprises a light source in said housing adjacent said circular track, and
   a photo sensing device in said housing adjacent said circular track and opposite said light source.

* * * * *